United States Patent [19]
McCrory

[11] Patent Number: 5,717,897
[45] Date of Patent: Feb. 10, 1998

[54] SYSTEM FOR COORDINATING COHERENCY OF CACHE MEMORIES OF MULTIPLE HOST COMPUTERS OF A DISTRIBUTED INFORMATION SYSTEM

[75] Inventor: Duane J. McCrory, Malvern, Pa.

[73] Assignee: Unisys Corporation, Blue Bell, Pa.

[21] Appl. No.: 709,595

[22] Filed: Sep. 9, 1996

[51] Int. Cl.⁶ .................................................. G06F 15/80
[52] U.S. Cl. .................... 395/468; 395/608; 395/471; 395/291; 364/DIG. 1
[58] Field of Search ............................ 395/468, 608, 395/291, 471, 800

[56] References Cited

U.S. PATENT DOCUMENTS

| | | | |
|---|---|---|---|
| 4,622,631 | 11/1986 | Frank et al. | 395/800 |
| 5,222,224 | 6/1993 | Flynn et al. | 395/471 |
| 5,261,109 | 11/1993 | Cadambi et al. | 395/291 |
| 5,442,758 | 8/1995 | Slingwine et al. | 395/608 |

OTHER PUBLICATIONS

Stallings, W., "Computer Organization And Architecture, Designing For Performance, Fourth Edition," Prentice Hall, New Jersey, 1996, pp. 133-138 and pp. 578-584.

Primary Examiner—Tod R. Swann
Assistant Examiner—David Langjahr
Attorney, Agent, or Firm—John B. Sowell, Esq.; Mark T. Starr, Esq.; John F. O'Rourke, Esq.

[57] ABSTRACT

Apparatus and method for coordinating cache coherency between host cache memories in a distributed information system in a system which comprises at least one main storage memory coupled to a plurality of host computers through controllers. Each host computer includes a host cache controller which maintains the state of the data stored in its associated memory and maintains communicating with a main memory controller for participating in the control of coordinated reading and writing of data between the host cache memories and the main storage memory. The system maintains cache coherency by the exchange of commands between the main memory controller and the hosts cache controllers each of which define the state of the blocks of data stored in the host cache memories.

20 Claims, 11 Drawing Sheets

SYSTEM FOR COORDINATING COHERENCY OF CACHE MEMORIES OF MULTIPLE HOST COMPUTERS OF A DISTRIBUTED INFORMATION SYSTEM

BACKGROUND OF THE INVENTION

1. Field of the Invention

The present invention relates generally to distributed computing systems, and more particularly to coordinating coherency between host caches in a distributed computing system.

2. Related Art

A distributed computing system generally comprises three types of components: workstations, hosts, and storage media. The storage media are used to store data required by the system. A storage medium may include magnetic disk drives, banks of memory chips, or the like. A host is a computer, such as a server, that executes applications for, and exchanges data with, one or more users. Hosts generally also provide users with access to the storage media. A user generally accesses the hosts via a workstation, which can be a personal computer or the like.

The relationship between the workstations and the hosts is often described in terms of the "client-server" paradigm. In this model, the workstation is called a "client" of the host because the workstation makes requests of the host, which the host is obliged to fulfill. The host "serves" the client by fulfilling these requests.

In a distributed computing system, as in other computing systems, a key performance consideration is the speed of operation. A common obstacle to speed is the delay involved in transferring data to and from storage media. In a distributed computing system, the storage media may not be located near the host, and so this delay is magnified.

One solution commonly employed to mitigate the delay problem is to provide a "data cache" within or near the host. When the host retrieves a particular data item (that is, a "datum") from the storage medium for the first time, the host "caches" that datum in the host's data cache on receipt. When the host requires that datum a second time, the host need only go as far as its cache to obtain it. When the host needs to update that datum, it need only update the datum in its cache. When the host no longer requires the datum, it either flushes its cache or writes the datum back to the storage medium. Because the host cache is near or within the host, the host cache access time (that is, the delay in transferring data to or from the host cache) is substantially shorter than the storage medium transfer delay.

In a distributed computing system, however, more than one host may employ the same storage medium. If multiple hosts are permitted to indiscriminately modify data cached from the same storage medium, the host caches may come to contain differing values for the same datum. The hosts thus will have inconsistent views of the storage medium. This condition is known as "cache inconsistency."

Cache inconsistency is a problem that is well-known in symmetric multiprocessor computer systems. Various schemes have been developed to eliminate the problem in these systems. Eliminating cache inconsistency is generally referred to as coordinating "cache coherency."

The cache coherency approaches that have been developed are generally divided into two types: hardware-based and software-based. These approaches are thoroughly described in William Stallings, *Computer Organization and Architecture, Design for Performance* (4th ed. 1996). A brief description is provided below.

Software-based approaches generally attack the problem at compile-time (that is, when the software is being compiled) by tuning the software to avoid situations that could result in cache inconsistency. This approach is well-suited to a single computer with multiple processors, but is inapplicable to a distributed computing system. Because different hosts may execute different applications simultaneously, it would be impractical or even impossible to coordinate every conceivable combination of applications at compile time to avoid cache inconsistency.

Hardware-based approaches generally attack the problem at run-time (that is, when the software is executing). One such approach is known as the "snoopy" protocol. In the snoopy protocol, each processor is responsible for recognizing when its cache shares data with other caches. When an update action is performed on shared cache data, it must be announced over the bus. Each processor monitors the bus (that is, "snoops") to observe these announcements, and reacts accordingly. Thus snoopy protocols are ideally suited to multiprocessor computers where the processors share a common bus. However, in a distributed computing system, the hosts usually do not share a common bus, and so snoopy protocols are impractical or impossible to implement.

Another approach is the so-called opportunistic lock (sometimes referred to as "oplock") optimization routine. This approach allows multiple users to access a file in a distributed information system. When one user opens a file for write access, he is granted an oplock for that file, and his local workstation can cache data from the file. When another user needs access to the file, the system revokes the first user's oplock and requires the first user to update the file from his local workstation cache. One disadvantage of the oplock approach is that it works only on a file level. Another disadvantage of the oplock approach is that each file is limited to one of two states: locked or unlocked.

What is needed therefore, is a system and method for coordinating host cache coherency in a distributed computing system.

SUMMARY OF THE INVENTION

The present invention is a system and method for coordinating coherency among the host caches of a distributed information system. The system includes at least one storage medium, a plurality of hosts, and a controller. Each host includes a host cache for caching data acquired from the storage media and a host cache controller for communicating with the controller for participating in the control of coordinated reading and writing of data between the host caches and the storage media.

The system coordinates cache coherency by exchanging commands between the controller and the hosts to control the cache states for data blocks cached in host caches. In one embodiment, the controller includes a directory for describing a global cache state for each block of data cached in one or more host caches. The controller uses the directory to respond to commands issued by hosts regarding particular data blocks. In another embodiment, the controller also includes a global cache that contains blocks of data cached by one or more host caches.

One advantage of the present invention is that it permits host cache coherency to be maintained in a distributed information system.

Further features and advantages of the present invention as well as the structure and operation of various embodiments of the present invention are described in detail below with reference to the accompanying drawings. In the drawings, like reference numbers indicate identical or functionally similar elements. Additionally, the left-most digits of a reference number identifies the drawing in which the reference number first appears.

BRIEF DESCRIPTION OF THE FIGURES

The present invention will be described with reference to the accompanying drawings, wherein.

DETAILED DESCRIPTION OF THE PREFERRED EMBODIMENTS

The preferred embodiment of the invention is discussed in detail below. While specific steps, configurations and arrangements are discussed, it should be understood that this is done for illustrative purposes only. A person skilled in the relevant an will recognize that other steps, configurations and arrangements can be used without departing from the spirit and scope of the present invention.

Figure 1:
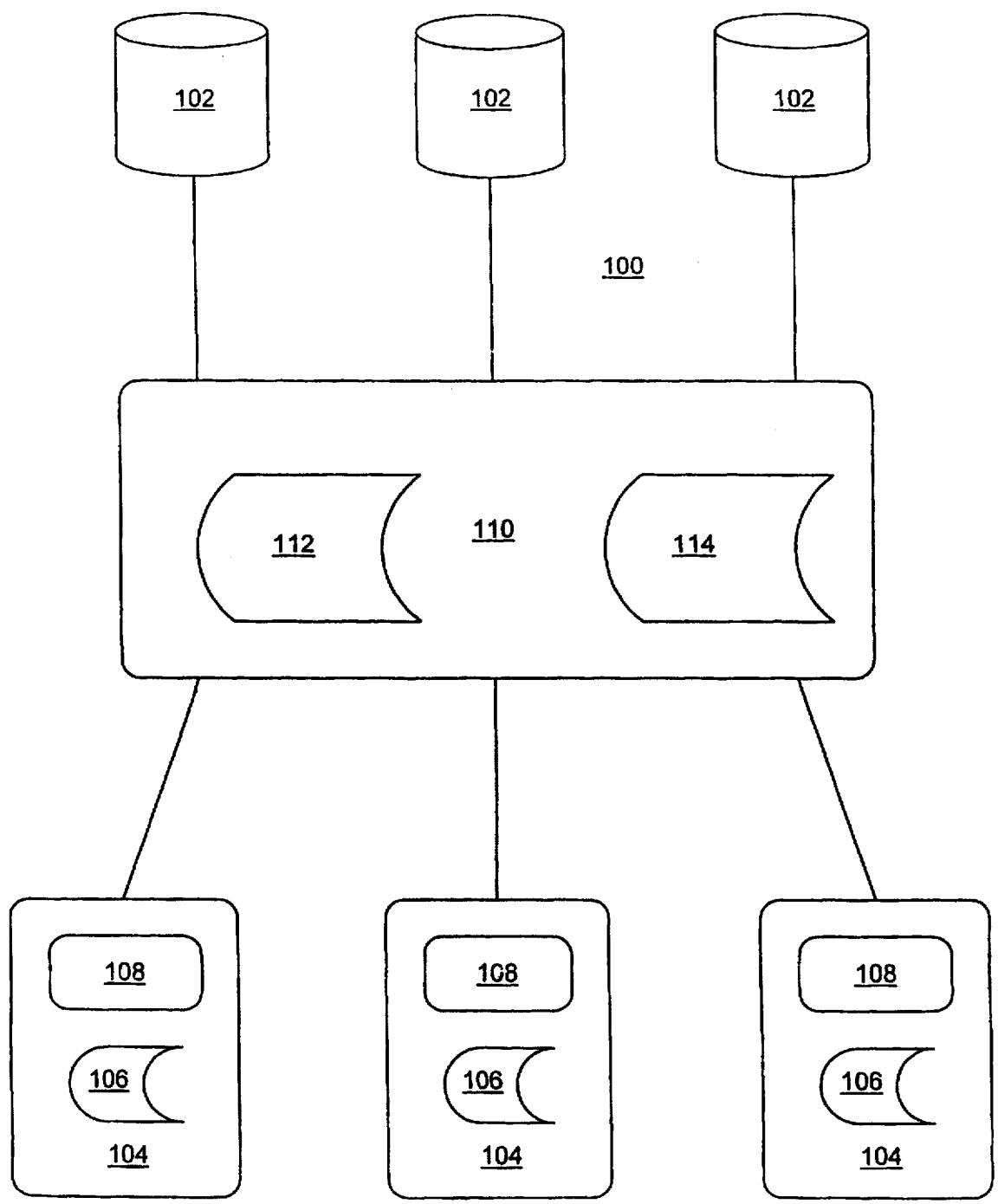
FIG. 1 is a block diagram for an example distributed communications system 100.

FIG. 1 depicts a distributed information system 100. System 100 includes at least one storage medium 102, a plurality of hosts 104 and a controller 110. Storage medium 102 may represent, for example, a hard disk drive array. Host 104 may represent, for example, a workstation. Each host 104 includes a host cache 106 and a host controller 108. Users generally access system 100 through workstations (not shown) connected to hosts 104.

Controller 110 includes a directory 112 for recording global states for data held by one or more host caches 106. The global state for a datum is an aggregation of the states of the copies of the datum in host caches 106, and represents the controller's view of the system. When appropriate, controller 110 considers the global cache state of a datum when responding to a host command regarding the datum. In one embodiment, controller 110 also includes a cache 114 for caching the data held by one or more hosts caches 106.

In a preferred embodiment of the present invention, controller 110 and hosts 104 exchange commands, responses, and data in order to main coherence between host caches 106. Data is generally transferred between storage media 102 and hosts 104 in chunks of various sizes, referred to hereinafter as "blocks."

In a preferred embodiment of the present invention, each host 104 employs one of four states to describe each block of data in its host cache 106: modified, exclusive, shared, or invalid. The modified cache state indicates that host 104 has modified the block in its host cache 106, but has not written the block back to storage media 102. Therefore, this host has the only current copy of the block.

The exclusive cache state indicates that the block in the host cache 106 is the same as that in storage media 102, and is not present in any other host cache 106. The shared cache state indicates that the block in the host cache 106 is the same as that in storage media 102, and may be present in another host cache 106. The invalid state indicates that the copy of the block in the host cache 106 is not valid.

In a preferred embodiment of the present invention, controller 110 employs one of three states to describe each block of data in its directory 112: exclusive, shared, or invalid. The exclusive cache state indicates that a host 104 has exclusive access to a cache block. From the perspective of controller 110, it is irrelevant whether the exclusive host has modified the data. The data block in the host cache may be in either the exclusive or modified state.

The shared cache state indicates that at least one host 104 is sharing the data block. In a preferred embodiment, the identity of the sharing hosts is stored in a sharing list within directory 112. The invalid state indicates that no host 104 has a valid copy of the block.

When a host 104 desires to acquire a data block, write a data block to storage media 102, or change the status of a cache block within its host cache 106, the host controller 108 for the host sends one or more host commands to controller 110. When controller 110 desires to change the cache state of a particular block in a particular host cache 106, controller 110 sends one or more controller commands to the host controller 108 for that host 104.

Tables 1 and 2 are state tables for a host cache 106 according to a preferred embodiment of the present invention. Table 1 lists example host commands that host controller 108 may issue to controller 110, and describes example state transitions for host cache 106 based on the response received from controller 110. Each host command specifies both a block of data on which to operate and a timeout value within which controller 110 must respond. If no response is received within the timeout period, then the action indicated in Table 1 is taken.

TABLE 1

| Host Command | Host Initial State | Controller Response | Host Final State |
| --- | --- | --- | --- |
| Acquire Block Shared | Invalid | Timeout | Invalid |
|  |  | Shared | Shared |
|  |  | Exclusive | Exclusive |
| Acquire Block Exclusive | Invalid | Timeout | Invalid |
|  |  | Success | Exclusive |
| Mark Block Exclusive | Invalid | Timeout | Invalid |
|  |  | Success | Exclusive |
|  | Shared | Timeout | Invalid |
|  |  | Success | Exclusive |
| Mark Block Shared and Write | Modified | Timeout | Modified |
|  |  | Success | Shared |
| Mark Block Shared | Exclusive | Timeout | Exclusive |
|  |  | Success | Shared |

TABLE 1-continued

| Host Command | Host Initial State | Controller Response | Host Final State |
|---|---|---|---|
| Mark Block Invalid and Write | Modified | Timeout Success | Modified Invalid |
| Mark Block Invalid | Exclusive | Timeout Success | Exclusive Invalid |
| (Host Modifies Block) | Exclusive | N/A | Modified |

TABLE 2

| Controller Command | Initial Host Cache State | Host Action | Final Host Cache State |
|---|---|---|---|
| Transition Block Shared | Exclusive | N/A | Shared or Invalid |
| | Modified | Write Back Data | Shared |
| | | N/A | Invalid |
| Transition Block Invalid | Exclusive | N/A | Invalid |
| | Modified | Write Back Data | Invalid |
| | Shared | N/A | Invalid |

The first column of Table 1 lists example host commands; the second column lists the initial cache state of the block indicated by the host command in the host cache 106; the third column lists the response of controller 110 to the host command; and the last column lists the final cache state of the block in host cache 106 based on the response of controller 110.

Table 2 lists example controller commands that controller 110 may issue to host controller 108, and describes example state transitions for host cache 106. The first column of Table 2 lists example commands available to controller 110; the second column lists the initial state of host cache 106 upon receiving the controller command; the third column lists the action the host takes in response to the controller command, and the last column lists the resulting host cache state for the indicated data block.

Controller 110 sends a Transition Block Shared command to a host 104 when the controller requires the host to mark a data block shared in the host cache 106. Controller 110 sends a Transition Block Invalid command to a host 104 when the controller requires the host to mark a data block invalid in the host cache 106.

Figure 2:
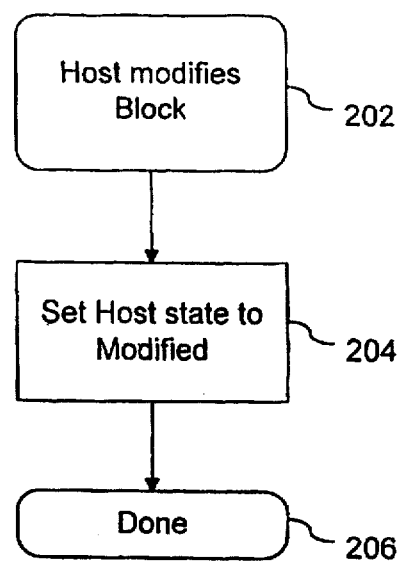
FIG. 2 is a flowchart depicting the operation of system 100 when a host modifies a block in its cache to which it has exclusive access.

FIGS. 2–9 are flowcharts depicting the operation of distributed data system 100 according to a preferred embodiment of the present invention. FIG. 2 is a flowchart depicting the operation of system 100 when a host 104 modifies a block in its cache to which it has exclusive access, as shown in a step 202. As shown in Table 1, the initial state of the block in host cache 106 is exclusive. Because the command is internal to the host, the final state of the host cache is not dependent on a response from controller 110. In response to the command, host 104 sets the state of the block in its host cache 106 to modified, as shown in a step 204.

Figure 3A:
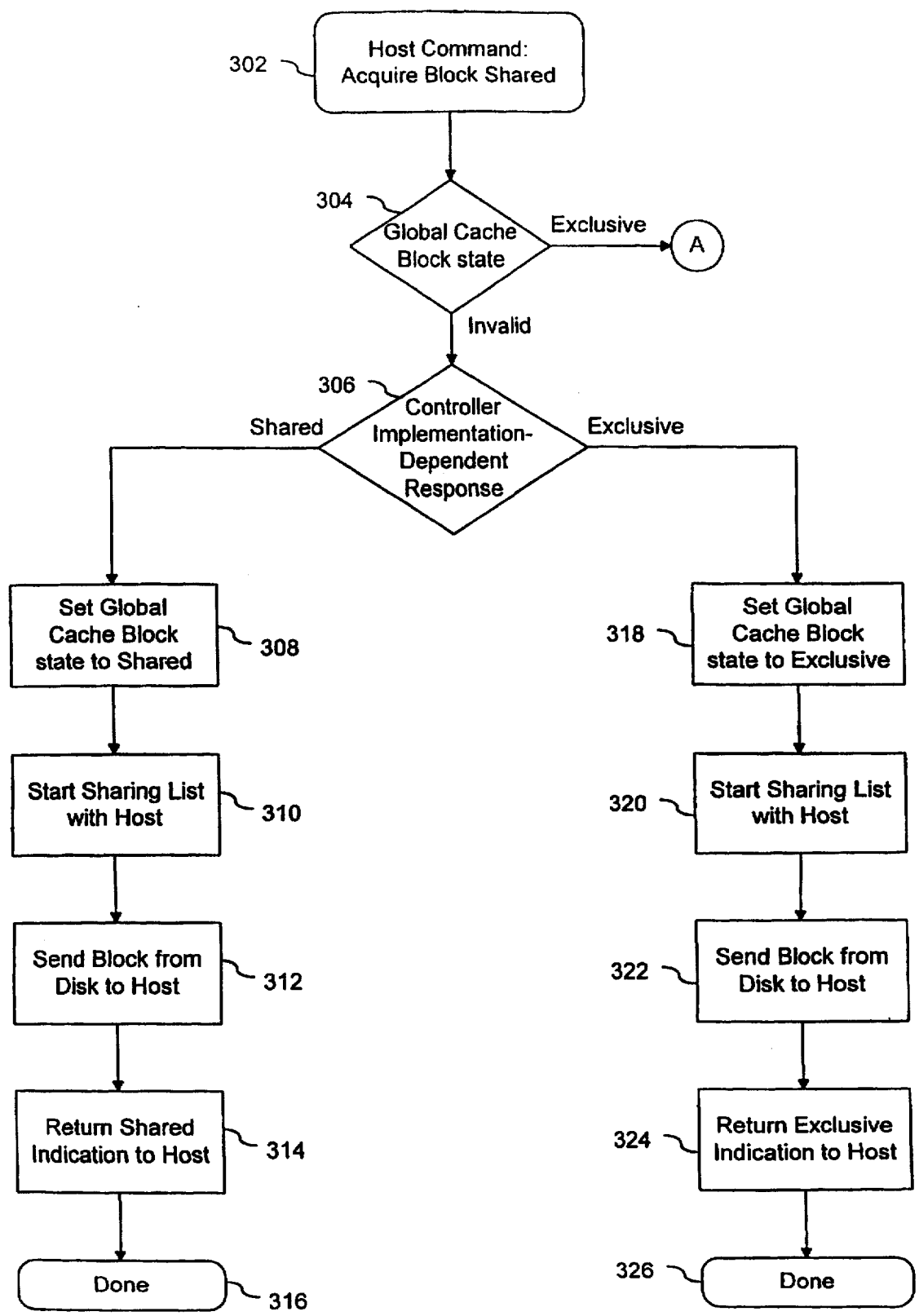
FIG. 3A is a flowchart depicting the operation of system 100 in response to a host command Acquire Block Shared.
Figure 3B:
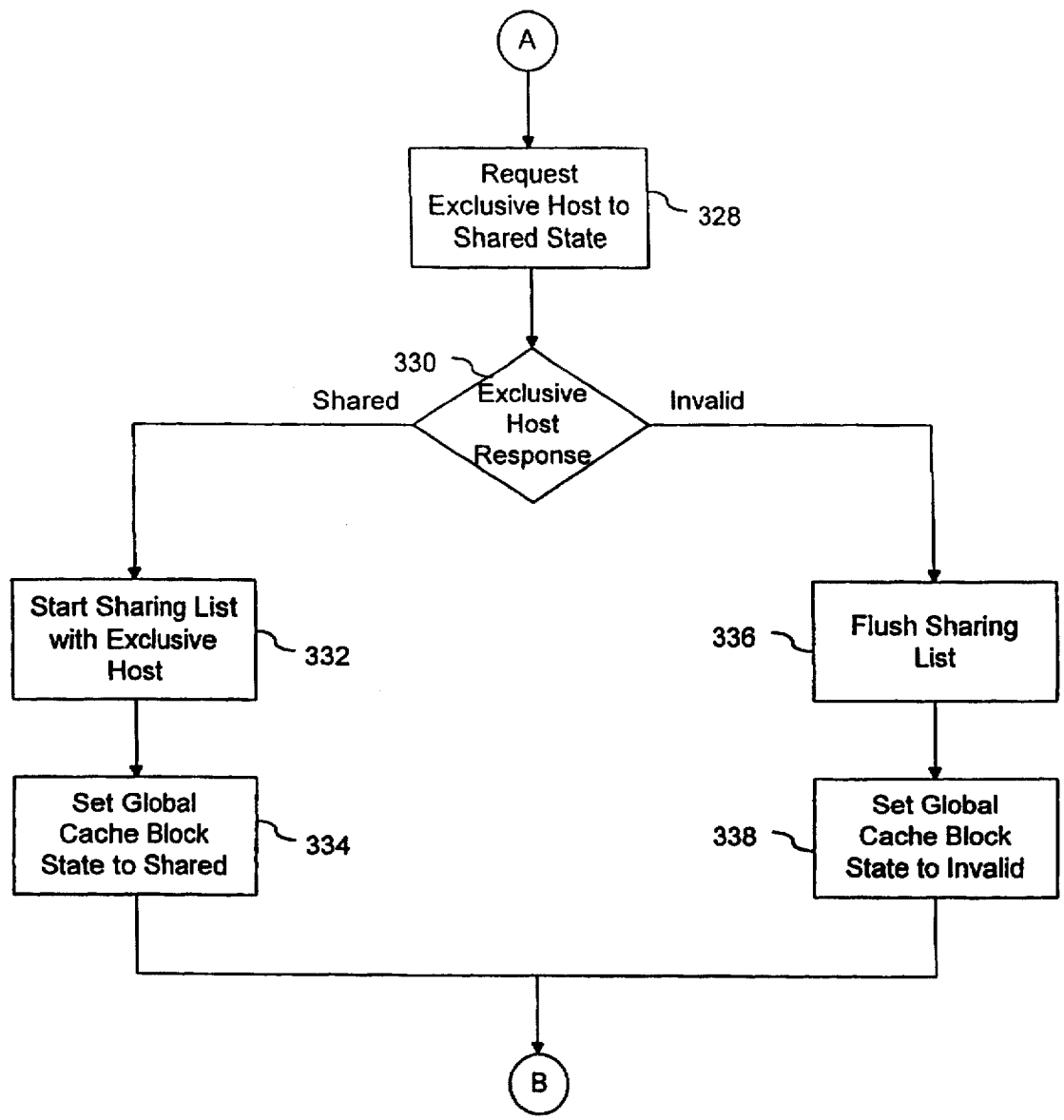
FIG. 3B is a flowchart depicting the operation of system 100 in response to a host command shown in FIG. 3A when block 304 detects an exclusive state.
Figure 3C:
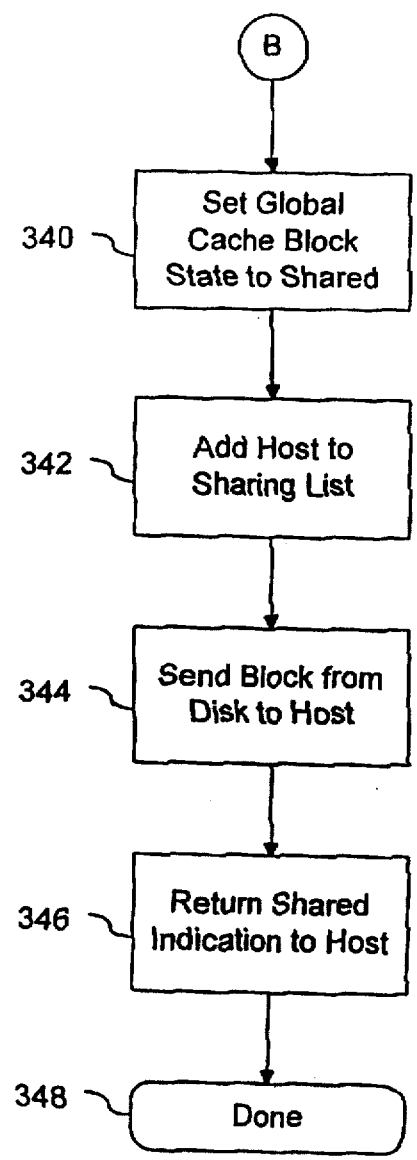
FIG. 3C is a continuation of the flowchart depicting the operation of system 100 in response to a host command shown in FIGS. 3A and 3B.

FIG. 3 depicts the operation of system 100 for the first command listed in Table 1, Acquire Block Shared, as shown in a step 302. A host 104 employs this command when it wants to acquire a block of data but does not intend to modify the block. The initial state of the host cache block for this command is invalid. Host 104 will mark its cache block in accordance with the indication received from controller 110 in response to the command. If the controller response is "shared," the final state of the host cache block will be shared. If the response is "exclusive," then the final state of the host cache block will be exclusive.

Referring to FIG. 3, when controller 110 receives the Acquired Block Shared command from the host 104, the global state of that cache block in directory 112 will be either exclusive or invalid. If the global cache block state (that is, the state recorded in directory 112) is invalid, then controller 110 must retrieve the block from storage media 102 for delivery to the requesting host 104. Therefore, controller 110 may set the global state of the retrieved cache block to either shared or exclusive, as shown in a step 306. This decision is implementation-dependent, as would be apparent to one skilled in the relevant art. If the controller response is "shared," then the global state for the cache block in directory 112 is set to shared, as shown in a step 308.

Whenever controller 110 permits hosts 104 to share a cache block, it maintains a list of those hosts (hereinafter referred to as a "sharing list"). Therefore, in a step 310, controller 110 creates a sharing list and enters host 104 as the first entry. As shown in a step 312, controller 110 then sends the requested block of data to requesting host 104. As shown in a step 314, controller 110 also returns a "shared" indication to host 104. In response to the indication, host 104 marks that cache block shared. At this point, requesting host 104 has a shared copy of the requested block.

However, if the controller response in step 306 is "exclusive," then the global state in directory 112 for the cache block is set to exclusive, as shown in a step 318. In a step 320, controller 110 creates a sharing list and enters host 104 as the first entry. Controller 110 creates sharing lists not only when a host requests shared access to a block, but also when a host obtains exclusive access to a cache block. This facilitates the transition of a host cache block from exclusive to shared because controller 110 already has the requesting host in a sharing list.

As shown in a step 322, controller 110 then sends the requested block of data to requesting host 104. As shown in a step 324, controller 110 also returns an "exclusive" indication to host 104. In response to the indication, host 104 marks that cache block exclusive. At this point, requesting host 104 has an exclusive copy of the requested block.

However, when controller 110 receives the Acquire Block Shared command, the global cache state for that block may be exclusive as shown in a step 304. This indicates that a host other than the requesting host has exclusive access to that cache block. In this case, controller 110 requests the exclusive host to transition its copy of the requested cache block to the shared state, as shown in a step 328, by issuing a Transition Block Shared command, as shown in Table 2. It should be noted that when a host receives a Transition Block Shared command from controller 110 and the indicated cache block is in the modified state, then the host writes that block back to storage media 102, as shown in Table 2.

Processing then diverges based on the response from the exclusive host to the controller command, as shown in a step 330. If the exclusive host response is "shared," then controller 110 creates a sharing list and enters the exclusive host as the first entry, as shown in a step 332. Controller 110 then sets the global state for the requested cache block to shared as shown in a step 334.

If the exclusive host response is "invalid," then the controller flushes its sharing list, as shown in a step 336, and sets the global cache state for the requested block to invalid, as shown in a step 338. Processing then converges at step 340 where controller 110 sets the global cache state for the requested block to shared. Controller 110 then adds the requesting host to the sharing list, as shown in a step 342, and sends the data block from disk 102 to the requesting host 104. Controller 110 also returns a "shared" indication to host 104, as shown in a step 346. In response, host 104 marks the cache block for the received block as shared. At this point, requesting host 104 has a shared copy of the requested block.

Figure 4:
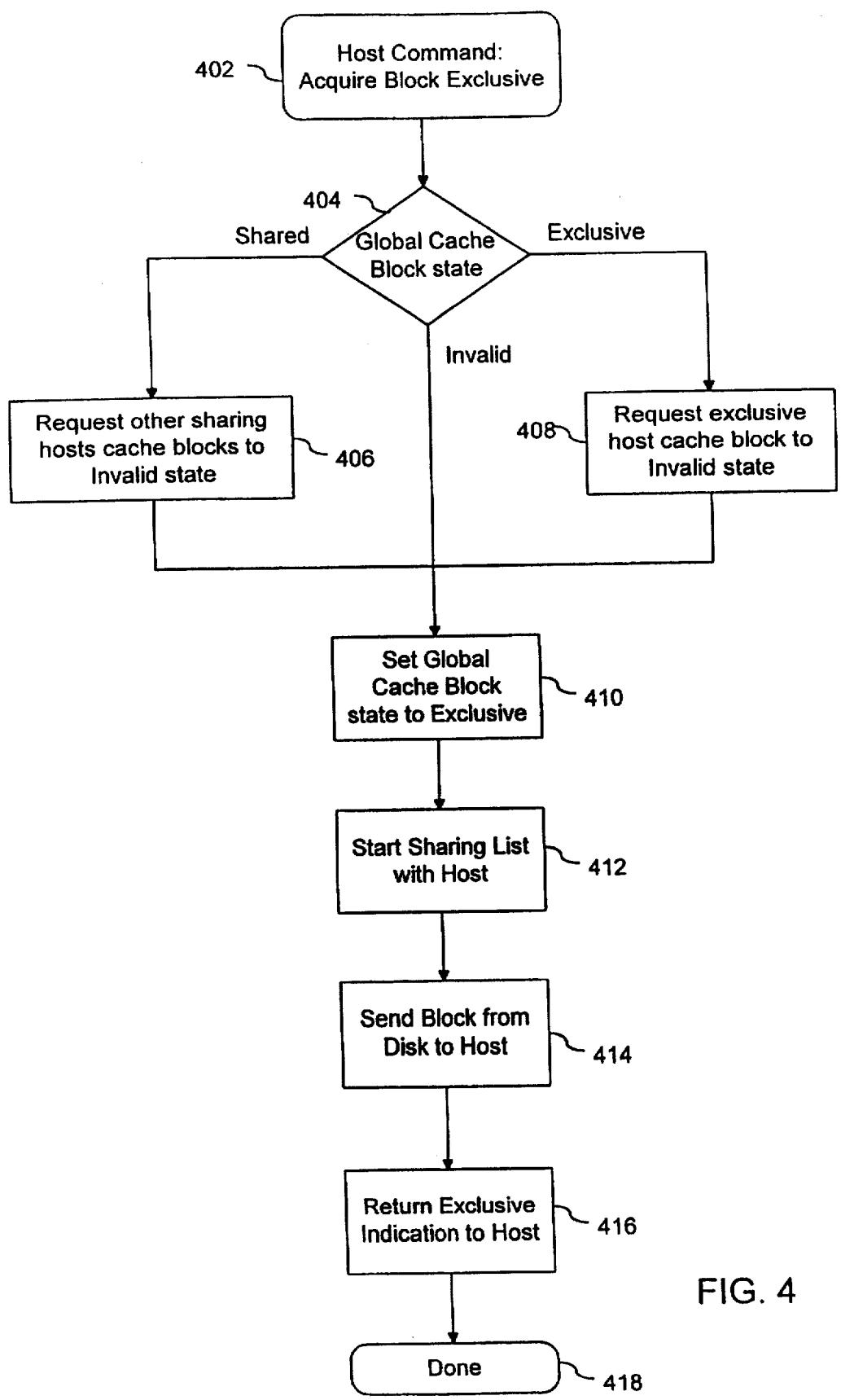
FIG. 4 is a flowchart depicting the operation of system 100 in response to a host command Acquire Block Exclusive.

FIG. 4 is a flowchart depicting the operation of system 100 in response to the second host command in Table 1, Acquire Block Exclusive, as shown in a step 402. This command is used when a host desires to obtain a block of data for which the host cache is currently marked invalid and which the host intends to modify. Therefore, as shown in Table 1, the initial host cache state is invalid. If the controller response is "success," then the host state for the cache block is changed to exclusive.

As shown in a step 404, the global cache state for the data block upon receipt of the Acquire Block Exclusive command is shared, exclusive, or invalid. A global state of shared indicates that hosts other than the requesting host are sharing the data block. In this case controller 110 requests the hosts in the sharing list to change the requested cache block in their host caches to the invalid state, as shown in a step 406, using the Transition Block Invalid command shown in Table 2.

Referring again to step 404, a global cache state of exclusive for the requested block indicates that a host other than the requesting host has exclusive access to that data block. In this case, controller 110 requests the exclusive host to transition its cache block for the requested block to the invalid state, as shown in a step 408, using the Transition Block Invalid command. It should be noted that, when the host receives a Transition Block Invalid command from controller 110 and the indicated cache block is in the modified state, then the host writes that block back to the controller, as shown in Table 2. However, if the global cache state for the requested block is invalid, then no host has a valid copy of the block.

Processing converges at step 410 where controller 110 sets the global state for the requested cache block to exclusive. Then, in a step 412, controller 110 creates a sharing list and enters requesting host 104 as the first entry. Controller 110 then sends the requested data block from disk 102 to requesting host 104, as shown in a step 414, and returns an "exclusive" indication to requesting host 104, as shown in a step 416. In response, requesting host 104 changes the requested cache block in its host cache 106 to the exclusive state.

Figure 5:
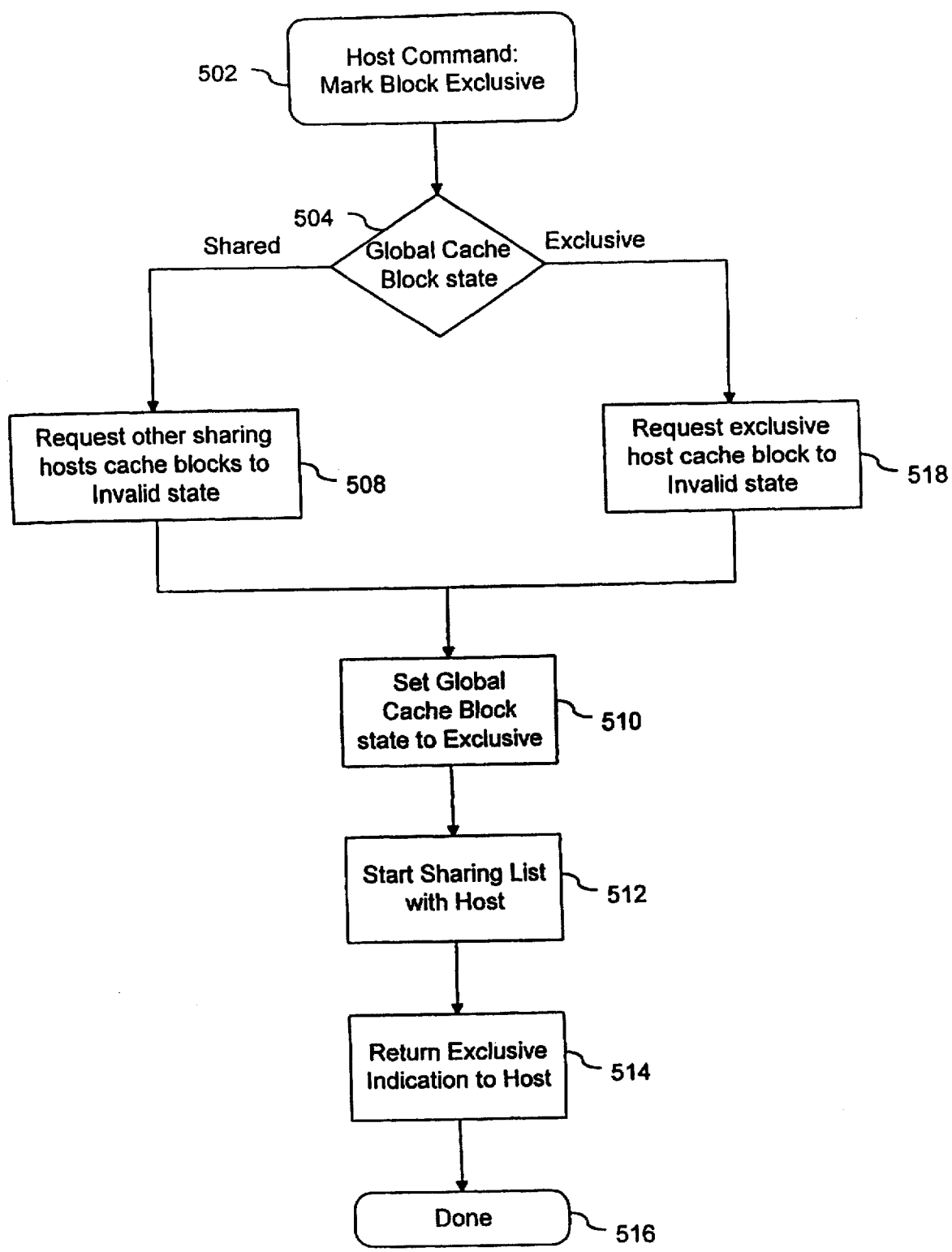
FIG. 5 is a flowchart depicting the operation of system 100 in response to a host command Mark Block Exclusive.

FIG. 5 is a flowchart depicting the operation of system 100 in response to the third host command in Table 1, Mark Block Exclusive, as shown in a step 502. A host 104 employs this command when its host cache 106 has non-exclusive access to a block of data which the host intends to modify. As shown in Table 1, the block in host cache 106 initially may be in either the invalid or shared state. In either case, upon a controller response of "success," the cache block in host cache 106 will transition to the exclusive state. Referring to FIG. 5, upon receipt of the Mark Block Exclusive command, the global cache state for the requested block may be either shared or exclusive, as shown in a step 504. If the global state is shared, then controller 110 requests the other sharing hosts to transition their copies of the requested cache block to the invalid state using the Transition Block Invalid command, as shown in a step 508. If the global cache state for the requested block is exclusive, then controller 110 requests the exclusive host to transition its copy of the requested cache block to the invalid state using the Transition Block Invalid command, as shown in a step 518. In either case, controller 110 then sets the global cache state for the requested block to exclusive, as shown in a step 510. Controller 110 then creates a sharing list for the cache block and adds requesting host 104 as the first entry. Controller 110 then returns an "exclusive" indication to the requesting host, as shown in a step 514. In response, requesting host 104 transitions its copy of the cache block to the exclusive state.

Figure 6:
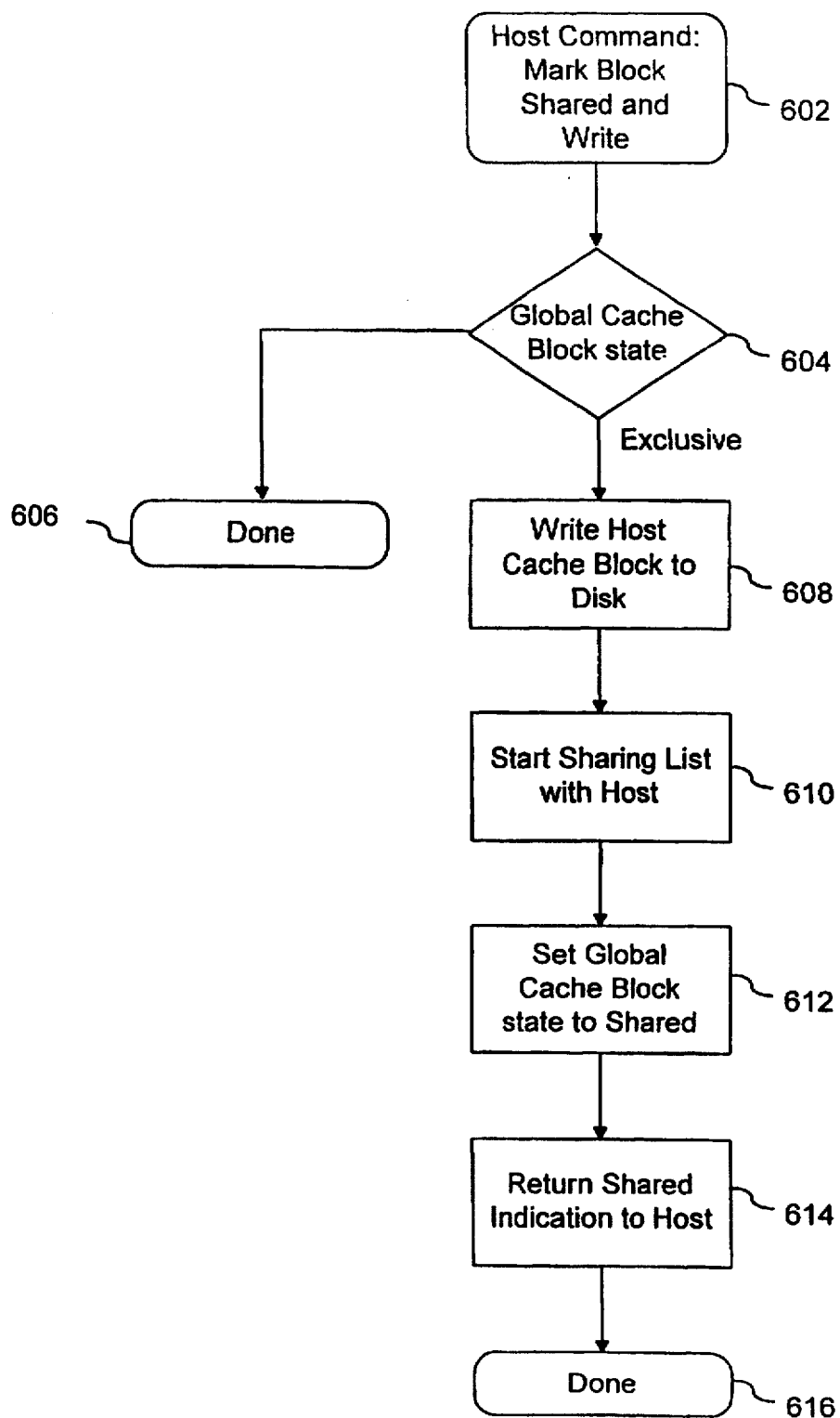
FIG. 6 is a flowchart depicting the operation of system 100 in response to a host command Mark Block Shared and Write.

FIG. 6 is a flowchart depicting the operation of system 100 in response to the fourth host command listed in Table 1, Mark Block Shared and Write, as shown in a step 602. A host 104 employs this command when it has modified a block of data and would like to return it to the disk but maintain shared access. If controller 100 returns a "success" response, then requesting host 104 will change the cache state for the requested block to shared.

As shown in a step 604, processing diverges based on the global cache state of the indicated block. If the cache state is not exclusive, then processing terminates as shown in a step 606. If the cache state is exclusive, then controller 110 writes the indicated block from host 104 to disk 102, as shown in a step 608. Controller 110 also creates a sharing list and adds requesting host 104 as the first entry, as shown in a step 610. Controller 110 then sets the global state for the written cache block to shared, as shown in a step 612, and returns a "shared" indication to requesting host 104, as shown in a step 614. In response, requesting host 104 changes its cache state for that block to shared.

Figure 7:
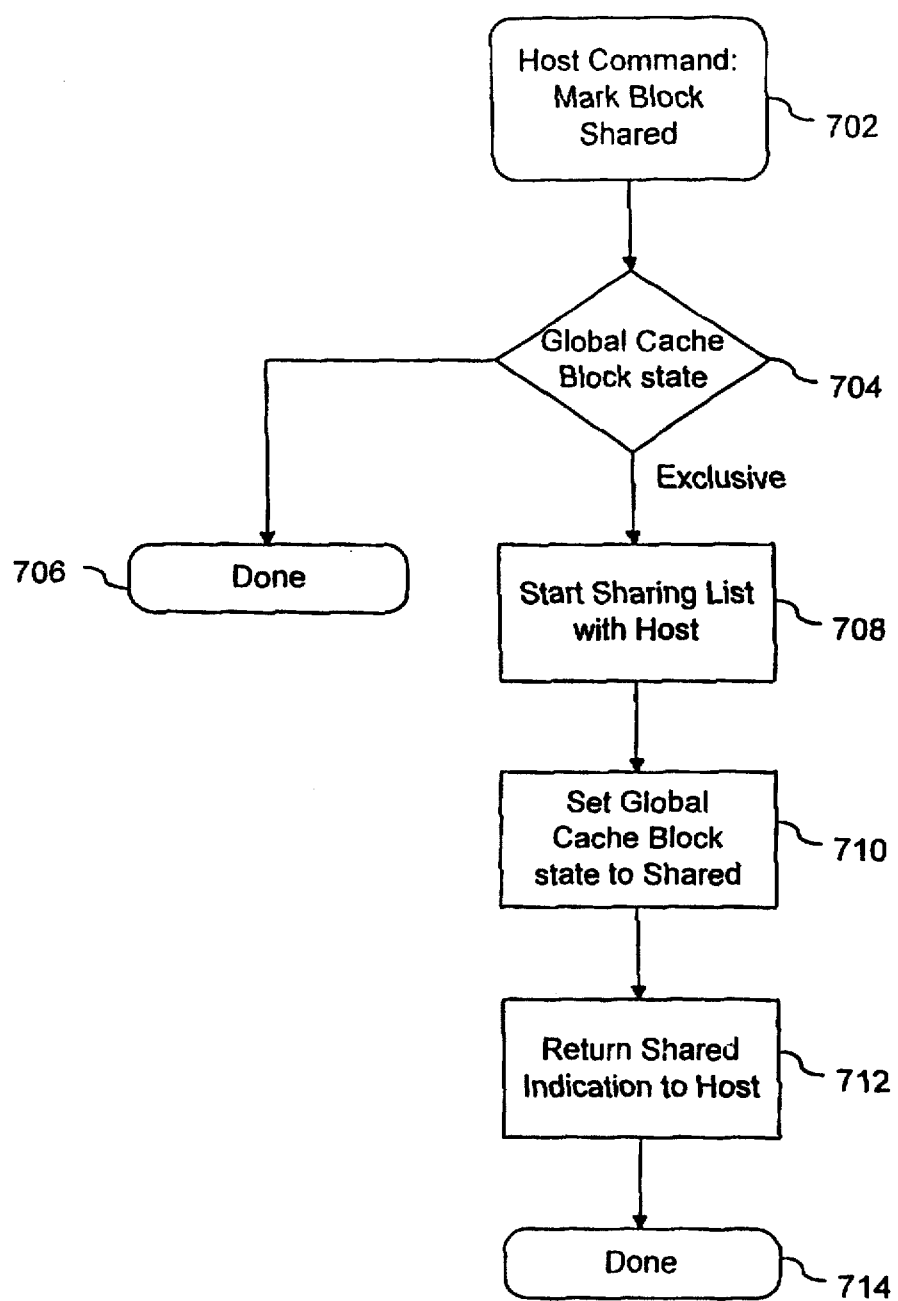
FIG. 7 is a flowchart depicting the operation of system 100 in response to a host command Mark Block Shared.

FIG. 7 is a flowchart depicting the operation of system 100 in response to the fifth command in Table 1, Mark Block Shared, as shown in a step 702. A host 104 employs this command when it has exclusive access to a data block but does not intend to modify that data block. The initial cache state for the data block in host cache 106 is exclusive. If the controller 110 returns a "success" response, then the host transitions the cache state for that block to shared in host cache 106, as shown in Table 1.

As shown in a step 704, processing diverges based on the global cache state of the indicated block. If the cache state is not exclusive, then processing terminates as shown in a step 706. If the cache state is exclusive, then controller 110 creates a sharing list and adds requesting host 104 as the first entry, as shown in a step 708. Controller 110 then sets the global state for the cache block to shared, as shown in a step 710, and returns a "shared" indication to requesting host 104, as shown in a step 712. In response, requesting host 104 changes its cache state for that block to shared.

Figure 8:
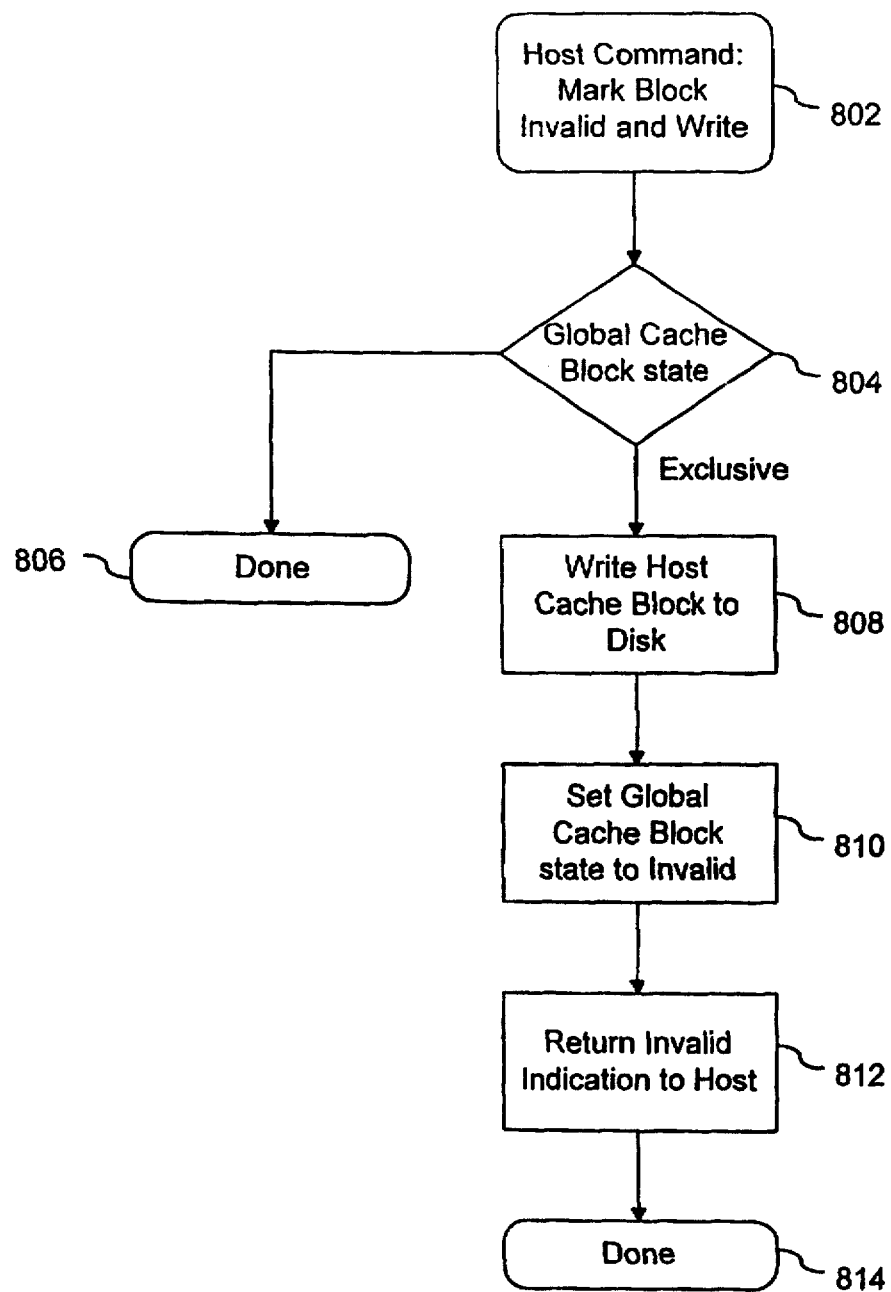
FIG. 8 is a flowchart depicting the operation of system 100 in response to a host command Mark Block Invalid and Write.

FIG. 8 is a flowchart depicting the operation of system 100 in response to the sixth command in Table 1, Mark Block Invalid and Write, as shown in a step 802. A host 104 employs this command when it has a data block in the modified state in its host cache 106 which it would like to flush from the cache and write back to disk 102. As shown in a step 804, processing diverges based on the global cache state of the indicated block. If the cache state is not exclusive, then processing terminates as shown in a step 806. If the cache state is exclusive, then controller 110 writes the indicated block from host 104 to disk 102, as shown in a step 808. Controller 110 then sets the global state for the written cache block to invalid, as shown in a step 810, and returns an "invalid" indication to requesting host 104 as shown in a step 812. In response, requesting host 104 changes its cache state for that block to invalid.

Figure 9:
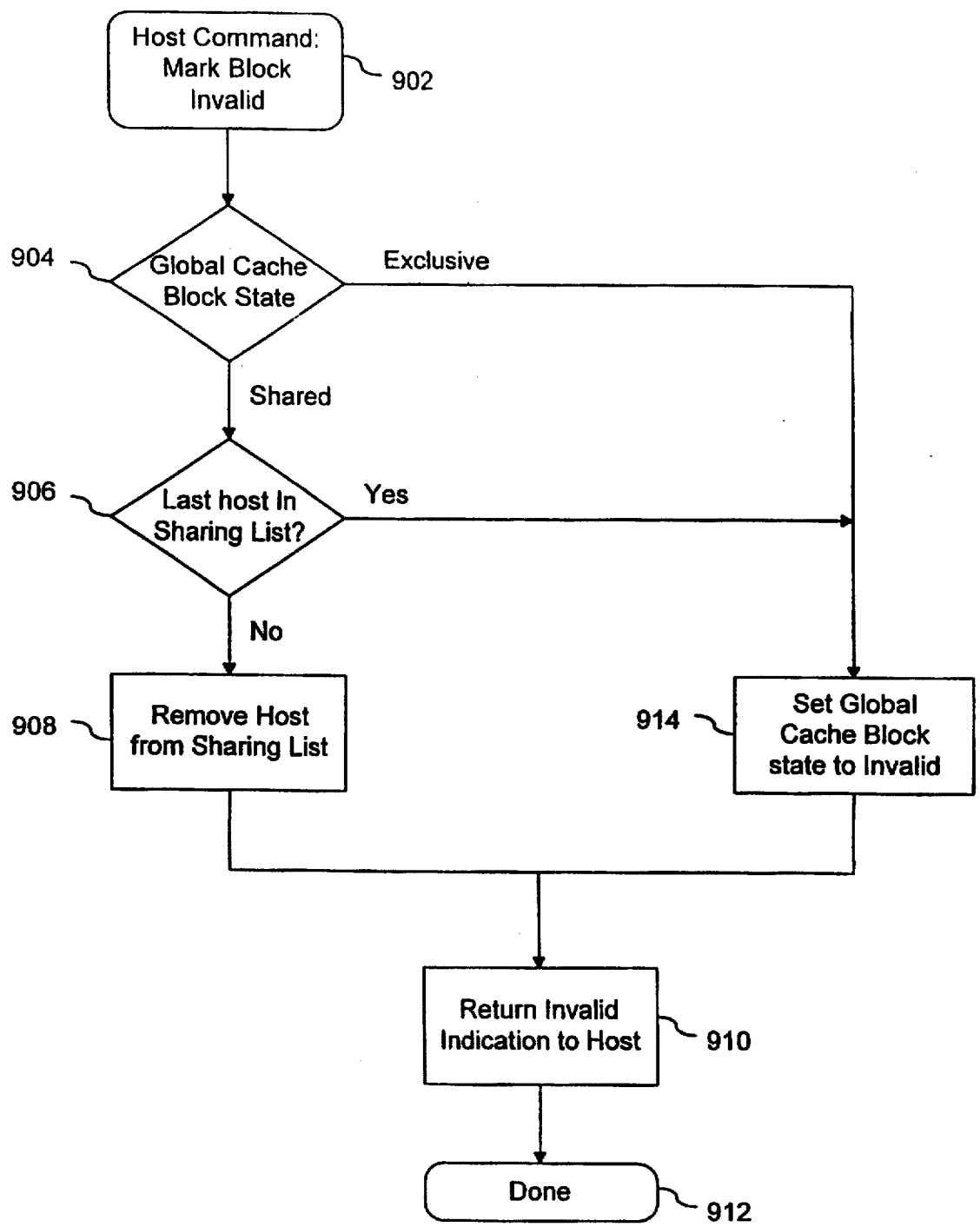
FIG. 9 is a flowchart depicting the operation of system 100 in response to a host command Mark Block Invalid.

FIG. 9 is a flowchart depicting the operation of system 100 in response to the seventh command in Table 1, Mark Block Invalid, as shown in a step 902. A host 104 employs this command when it has exclusive access to a cache block which it would like to terminate the access without writing the data back to disk 102. The cache state for that data block in host cache 106 will transition from exclusive to invalid on receipt of a "success" response from controller 110. When controller 110 receives this command, the global cache state for the indicated block will be either exclusive or shared, as shown in a step 904. If the state is exclusive, then controller 110 sets the global state for that cache block to invalid, as shown in a step 914.

However, if the global cache state is shared, processing then diverges based on whether the requesting host is the last host in the sharing list for the requested data block, as shown in a step 906. If so, then controller 110 sets the global cache state for the requested block to invalid, as shown in a step 914. If not, then controller 110 removes the requesting host from the sharing list, as shown in a step 908. Processing then converges at step 910 where controller 110 returns an "invalid" indication to requesting host 104. In response, requesting host 104 transitions the state of the requested cache block to invalid.

The example sets of host and controller commands described above permit system 100 to coordinate cache coherency among host caches 106. As would be apparent to one skilled in the relevant art, other host and/or controller commands can be employed without departing from the spirit and scope of the present invention.

While various embodiments of the present invention have been described above it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A system for coordinating cache coherency in a distributed information system, comprising:
   at least one main storage memory;
   a plurality of host computers, each having a cache memory add a host cache controller;
   a main memory controller connected between said at least one main storage memory and said plurality of host computers;
   each said host cache controller providing the means for communicating with said main memory controller and for participating in the control of the coordinated reading and writing of blocks of data between said host cache memories and said at least one main storage memory.

2. The system of claim 1, wherein said main memory controller includes a directory for describing the global cache state of each of the blocks of data stored in said host cache memories.

3. The system of claim 1, wherein said main memory controller includes a global cache for storing blocks of data stored by one or more of said host cache memories.

4. The system of claim 1, wherein one of said plurality of host sends an Acquire Block Shared command to said main memory controller when said host computer desires shared access to a block of data stored in said main storage memory.

5. The system of claim 1, wherein one of said plurality of host cache controller sends an Acquire Block Exclusive command to said main memory controller when said host computer desires to modify a block of data stored in said main storage memory,
   said block of data being marked invalid in said host cache memory by said host cache controller.

6. The system of claim 1, wherein one of said plurality of host computers sends a Mark Block Exclusive command to said main memory controller when said host computer desire to modify a block of data stored in said main storage memory, said block of data being marked in said host cache memory as one of shared or invalid or by said cache controller.

7. The system of claim 1, wherein one of said plurality of host computers sends a Mark Block Shared and Write command to said controller when said host computer desires to write a block of data to said main storage memory and maintain shared access to said block of data, said block of data being marked modified in said host cache memory by said cache controller.

8. The system of claim 1, wherein one of said plurality of host computers sends a Mark Block Shared command to said main memory controller when said host computer does not intend to modify a block of data stored in said main storage memory, said block of data being marked exclusive in said host cache memory by said cache controller.

9. The system of claim 1, wherein one of said plurality of host computers sends a Mark Block Invalid and Write command to said main memory controller when said host computer desire requires to write a block of data to said main storage memory and terminate access to said block of data, said block of data being marked modified in said host cache memory by said cache controller.

10. The system of claim 1, wherein one of said plurality of host computers sends a Mark Block Invalid command to said main memory controller when said host computer desires to terminate access to a block of data, said block of data being marked exclusive in said host cache memory by said cache controller.

11. The system of claim 1, wherein said main memory controller sends a Transition Block Shared command to one of said plurality of host computers when said main memory controller desires that said one of said plurality of host computer when said main memory desires that said one of said plurality of host cache controllers to mark a block of data shared in said host cache memory.

12. The system of claim 1, wherein said main memory controller sends a Transition Block Invalid command to one of said plurality of host computers when said main memory controller desires that said one of said plurality of host computers mark a block of data invalid in said host cache memory.

13. A distributed processing system having a plurality of independently operable host computers arranged to share a main memory and maintain data coherency in the system, comprising;
   main memory means comprising at least one main storage medium,
   a plurality of host computers each having an associated cache memory and a cache controller,
   a main controller coupled to said main memory means and to each of each cache controllers for maintaining cache coherency in said distributed processing system,
   said main controller having a directory for recording and maintaining the global status of data in all of said cache memories, and
   said main controller querying said directory in response to a command from a cache controller of a host computer in order to maintain coherency of data in the cache memories of the other host computers.

14. A system as set forth in claim 13 wherein said main controller further includes a second level cache memory for maintaining blocks of data also stored in host cache memories for speeding up data transfer between host computers.

15. A system as set forth in claim 13 wherein said host computers cache controllers maintains cache coherency between host computers by defining its blocks of data in one of a plurality of states.

16. A system as set forth in claim 15 wherein said plurality of states comprises modified, exclusive, shared and invalid states.

17. A system as set forth in claim 13 wherein said main controller maintains cache coherency between main memory and cache memories by defining blocks of data in its directory in one of three states comprising exclusive, shared or invalid.

18. A method of maintaining cache coherence between a plurality of host computers in a distributed processing system each having a cache memory and access to a shared main memory, comprising the steps of:

coupling the main memory to a main memory controller, coupling said main memory controller to a plurality of individual cache controllers, coupling each of said cache controllers to a host computer of the typed adapted to serve clients requests, providing in said main memory controller a global directory for maintaining the state of said cache memories, defining the state of each of said cache memories in one of four states, changing the state of a cache memory in said global directory in response to a cache controller request, and subsequently changing the state of the plural cache memories in response to the same request.

19. The method as set forth in claim 18 wherein said main memory controller maintains a state of each block of memory in each of said cache memories in its directory and provides access to said main memory.

20. The method as set forth in claim 19 wherein said cache controllers each are capable of defining the state of a block of data in its own cache memory as being modified, and blocking access to the same block of unmodified data in said main memory until the modified block of data is transferred into main memory from a cache memory.

* * * * *